US012800980B2

(12) United States Patent
Komljenovic et al.

(10) Patent No.: US 12,800,980 B2
(45) Date of Patent: Nov. 17, 2026

(54) OPTIMIZED FREQUENCY CONVERSION PHOTONIC INTEGRATED CIRCUITS

(71) Applicants: Tin Komljenovic, Goleta, CA (US); Minh Tran, Goleta, CA (US)

(72) Inventors: Tin Komljenovic, Goleta, CA (US); Minh Tran, Goleta, CA (US)

(73) Assignee: Nexus Photonics, Inc, Goleta, CA (US)

( * ) Notice: Subject to any disclaimer, the term of this patent is extended or adjusted under 35 U.S.C. 154(b) by 527 days.

(21) Appl. No.: 18/503,396

(22) Filed: Nov. 7, 2023

(65) Prior Publication Data

US 2025/0147383 A1 May 8, 2025

(51) Int. Cl.

*G02F 1/35* (2006.01)
*G02F 1/355* (2006.01)
*G02F 1/37* (2006.01)

(52) U.S. Cl.

CPC .......... *G02F 1/3503* (2021.01); *G02F 1/3501* (2013.01); *G02F 1/353* (2013.01); (Continued)

(58) Field of Classification Search

CPC ........ G02F 1/3503; G02F 1/353; G02F 1/354; G02F 1/3556; G02F 1/37

See application file for complete search history.

(56) References Cited

U.S. PATENT DOCUMENTS 5,546,220 A * 8/1996 Endo ........................ G02F 1/377 359/332
7,593,443 B2 * 9/2009 Tojo ...................... H01S 3/1312 372/39

(Continued)

OTHER PUBLICATIONS

Bohan Li, "High-coherence hybrid-integrated 780 nm source by self-injection-locked second-harmonic generation in a high-Q silicon-nitride resonator", https://arxiv.org/abs/2306.10660 (Jun. 2023).

(Continued)

*Primary Examiner* — Daniel Petkovsek
(74) *Attorney, Agent, or Firm* — Shalini Venkatesh

(57) ABSTRACT

A device has an input port configured to receive as a device input a fundamental optical mode characterized by an input wavelength and a corresponding fundamental frequency; an output port configured to provide as a device output an $N^{th}$ harmonic mode characterized by a $N^{th}$ harmonic frequency relative to the fundamental frequency, where N>1; and a resonator with first and second coupler structures and first and second tuner elements. The first coupler structure is optimized for operation at the fundamental frequency, and the second coupler structure is optimized for operation at the $N^{th}$ harmonic frequency. The first tuner element can change a refractive index experienced by each of the fundamental and $N^{th}$ harmonic optical modes. The second tuner element can change a refractive index experienced by the fundamental optical mode but cannot change a refractive index experienced by the Nth harmonic optical mode.

15 Claims, 6 Drawing Sheets

(52) U.S. Cl.
CPC ............ *G02F 1/354* (2021.01); *G02F 1/3556* (2013.01); *G02F 1/37* (2013.01)

(56) References Cited

U.S. PATENT DOCUMENTS

| | | | | |
|---|---|---|---|---|
| 11,537,026 | B2 * | 12/2022 | Zhang | G02F 1/3536 |
| 11,971,577 | B2 * | 4/2024 | Tran | G02B 6/12004 |
| 12,300,963 | B2 * | 5/2025 | Okawachi | H01S 5/005 |

OTHER PUBLICATIONS

Marco Clementi, "A chip-scale second-harmonic source via injection-locked all-optical poling", https://arxiv.org/abs/2307.00163 (Jul. 2023).

Leiran Wang, "Frequency comb generation in the green using silicon nitride microresonators", Laser & Photonics Review, 10, 631-638 (Jun. 2016).

* cited by examiner

OPTIMIZED FREQUENCY CONVERSION PHOTONIC INTEGRATED CIRCUITS

FIELD OF THE INVENTION

The present invention relates to photonic integrated circuits. More specifically, certain embodiments of the invention relate to improved performance and control of frequency conversion elements realized as resonators in photonic integrated circuits.

BACKGROUND OF THE INVENTION

A photonic integrated circuit (PIC) or integrated optical circuit is a device that integrates multiple photonic functions and as such is analogous to an electronic integrated circuit. The major difference between the two is that a photonic integrated circuit provides functions for information signals imposed on optical carrier waves.

Depending on the application, a PIC might operate at various frequencies or wavelengths. In the case of a datacom application, the PIC might for instance operate around 1.31 μm, while telecom applications might prefer PICs operating around 1.55 μm. Similarly, LIDAR application might utilize PICs operating around 940 nm, or 1.55 μm, while various quantum applications might utilize PICs operating in extremely broadband wavelength ranges from <400 nm to 1700 nm and beyond. Other applications might have different operating wavelengths. In many cases, it is beneficial if such wide spans can be coherently bridged using frequency conversion, such as e.g., frequency doubling or frequency tripling.

One example would be the frequency doubling (generating a second harmonic of) a narrow-linewidth InP laser operating around 1550 nm, to provide a similarly narrow linewidth source emitting at around 775 nm. A second example is addressing the green-yellow gap in available sources emitting between 535 nm and 630 nm. This wavelength region is very challenging to support with direct emission elements, with only LED sources (as opposed to laser sources) commercially available, due to the challenges associated with shifting the bandgap of GaN-based gain media to longer wavelengths. However, the wavelength "gap" region can be accessed by frequency doubling the output of GaAs sources operating between 1070 nm and 1260 nm, where direct emission from GaAs occurs with very high efficiency. Various other similar combinations can be envisioned, including cases where harmonics of higher order than the second are generated.

Recently, high efficiency PIC-based non-linear conversion has been demonstrated utilizing resonant elements that facilitate quasi-phase matched frequency conversion leveraging a photoinduced photo-galvanic effect (see e.g. Bohan Li et al., "High-coherence hybrid-integrated 780 nm source by self-injection-locked second-harmonic generation in a high-Q silicon-nitride resonator", https://arxiv.org/abs/2306.10660 and Marco Clementi et al., "A chip-scale second-harmonic source via injection-locked all-optical poling" https://arxiv.org/abs/2307.00163). The effect leverages a doubly resonant configuration in which there is power buildup in a resonator both at the pump (fundamental) and at a doubled (second harmonic) or tripled (third harmonic) frequency. The all-optical poling effect was achieved via a photo-galvanic field-induced second-order non-linearity that facilitates efficient conversion. This approach is very powerful, as it enables efficient non-linear conversion (frequency doubling or tripling) using just high-Q resonators, without a need for precise phase matching of the two frequencies/wavelengths.

Historically, frequency doubling on PICs relied on either precise phase matching of modes using two polarizations, or quasi-phase matching by fabricating periodically poled (PP) structures; both of these approaches are very sensitive to fabrication tolerances. The resonator approach described in Bohan Li and Marco Clementi references is powerful, but in practice it has some limitations. One of the key limitations is that it can only provide a resonant condition at both fundamental and higher order harmonic frequencies at some, but not all, wavelengths (see Marco Clementi FIG. 2 as an example), a condition which is extremely important for e.g., quantum applications where optical sources have to operate at or very close to the atomic transitions, meaning the operating wavelength is fixed and frequency conversion cannot utilize changing of the operating wavelength to improve the conversion efficiency. In cases where we do not require precise wavelengths, we can generally tune the resonator and/or the laser to meet the resonance condition as shown in Marco Clementi but the regions where such conversion is efficient is generally limited, meaning that efficient conversion cannot be achieved at any arbitrary, desired wavelength with a single resonator. The issue is further amplified by slight variations of the fabrication process, meaning that even if one of the resonators with a particular geometry can indeed provide efficient non-linear conversion at a particular wavelength, nominally identical resonators might not be able to do the same as there could be slight variations in waveguide cross-section (both thickness and width) due to typical tolerances of the semiconductor process. This impacts manufacturability of such sources and could impact yield of PICs utilizing the same and ability to scale their complexity.

The present invention is directed to improving functionality (so that conversion can be achieved at any arbitrary optical wavelength), performance (optimizing conversion efficiency) and yield (tuning control to account for fabrication variations). In particular, embodiments described below are concerned with the detailed design of photonic devices and with methods to control them to create high-performance, high-yield resonant based frequency converters, by utilizing at least two de-coupled tuning mechanisms for matching the resonances at the fundamental frequency and a higher order harmonic frequency at any wavelength inside the design range, which can be as wide or wider than 100s of GHz (typically but not always defined by resonators couplers).

DETAILED DESCRIPTION

Described herein are embodiments of a platform for the realization of photonic integrated circuits comprising frequency conversion elements with improved performance and yield, utilizing at least two de-coupled tuning mechanisms for the resonator at fundamental and harmonic frequency.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" means that two or more elements are in direct contact in at least part of their surfaces.

Figure 1:
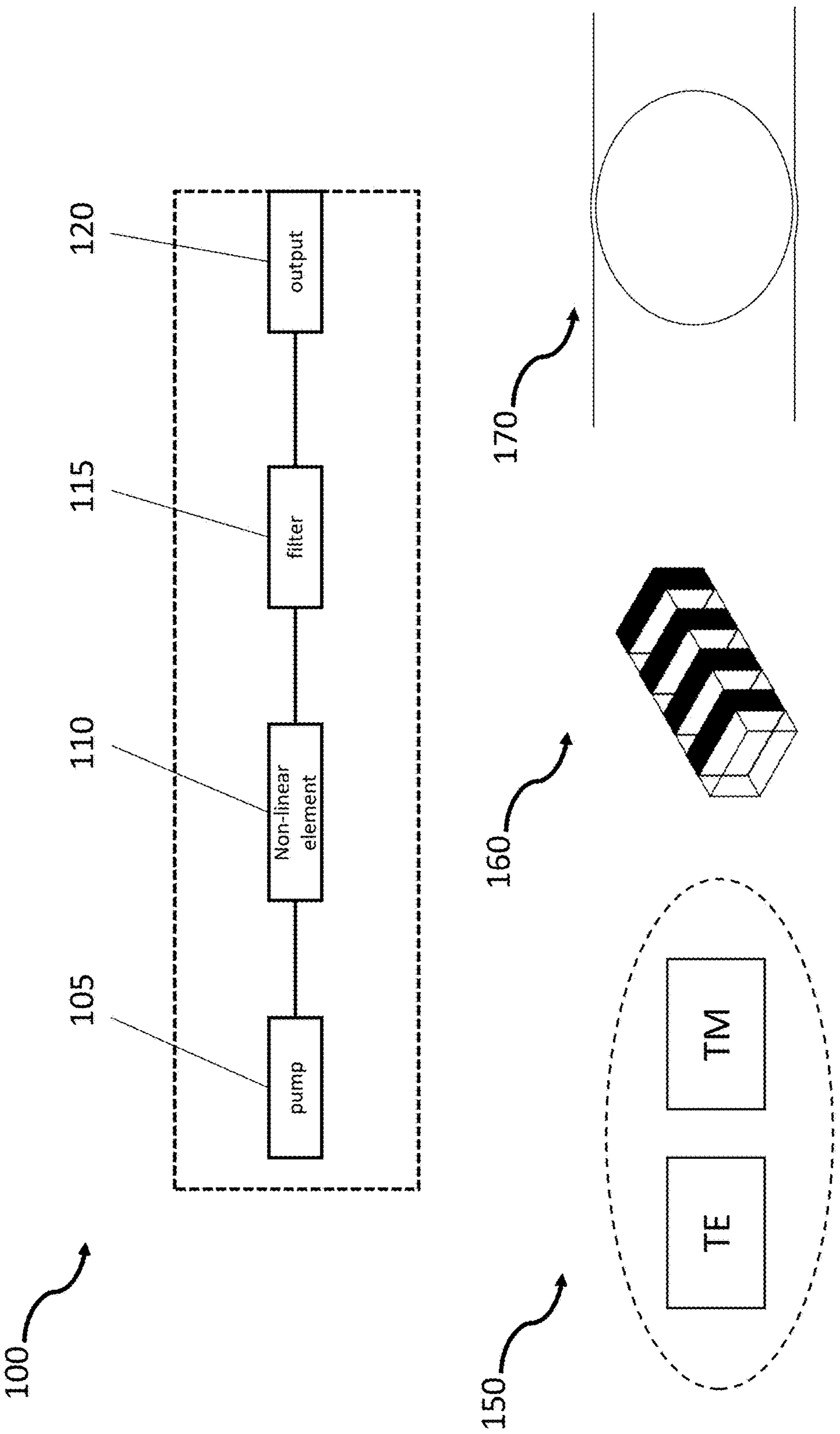
Figure 1 (Prior Art)
FIG. 1 (prior art) illustrates prior art architectures for generating frequency conversion on a PIC, and several typical approaches used to improve efficiency.

FIG. 1 (prior art) depicts a top-down view of a photonics integrated circuit (PIC) 100 providing frequency conversion. PIC 100, in general, comprises a pump laser 105, a non-linear element 110 which is configured for efficient frequency conversion, an optical filter 115 used to filter out the pump, and output port 120 where most of the frequency generated signal (second or higher order harmonic) is outputted from the PIC. In some embodiments, pump 105 and/or filter 115 can be external to the PIC. In yet other embodiments, a filter might not be used at all.

The non-linear element 110 can be realized in several ways as illustrated in views 150, 160 and 170. The approach illustrated in view 150 utilizes phase matching of two modes in the waveguide, which is commonly done by phase matching one TE mode to one TM mode (due to a large difference in wavelength between the modes) as described in e.g., Eric J. Stanton et al., Efficient second harmonic generation in nanophotonic GaAs-on-insulator waveguides", Optica, 28, 9521-9532 (2020). Phase matching is generally challenging, as small fabrication variations of the waveguide dimensions can significantly reduce the efficiency of non-linear conversion and negatively impact yield.

The approach illustrated in 160 utilizes periodic polling (PP). PP can be created using a range of techniques such as pulsed electric field, electron bombardment, thermal pulsing, or other methods. A common material that is periodically polled for non-linear generation is lithium niobate (LiNbO3), see e.g., Lin Chang et al., "Thin film wavelength converters for photonic integrated circuits", Optica, 3, 531-535 (2016), but other materials such as potassium titanyl phosphate (KTP), or lithium tantalate (LiTaO3) can be utilized. A general challenge with PP and materials used with PP is the lack of compatibility with established fabrication processes, in particular those of the silicon-based complementary metal-oxide semiconductor (CMOS) technology which is widely adopted by the electronics and silicon photonics market. This limits their deployment. Even in non-CMOS technologies, the PP process is generally challenging and, combined with waveguide dimension variations of these less developed processes, results in larger variation in the efficiency of non-linear conversion. and correspondingly impacts both the efficiency and the yield of such system.

The approach illustrated in 170 utilizes a resonant structure for power buildup where high quality factor and finesse of the resonator can increase intra-cavity powers to facilitate more efficient conversion. As described in e.g. Bohan Li et al., and Marco Clementi et al., (full references given above) the process can be very efficient if the resonator is configured such that both the fundamental and the higher order harmonic of interest are resonant (and therefore both exhibit a power buildup inside the resonator). This in turn leads to a photogalvanic-induced optical poling that is inherently phase matched and inherently compensates for fabrication variations (in contrast to prior art methods discussed above). A similar approach has also been demonstrated to result with frequency tripling (see e.g., Leiran Wang et al., "Frequency comb generation in the green using silicon nitride microresonators", Laser & Photonics Review, 10, 631-638 (2016)). While the intrinsic self-alignment of optical poling significantly relaxes the fabrication tolerances of the waveguide dimensions, the need to match the resonances at both the fundamental and the second harmonic limits the technique as described in more details in Marco Clementi et al (full citation given above) if precise wavelengths are required (as in e.g., quantum applications utilizing atomic transitions), or if such systems are to be scaled in complexity because simply tuning the resonator utilizing e.g., a heater does not allow resonances to be matched at any arbitrary wavelength.

Figure 2:
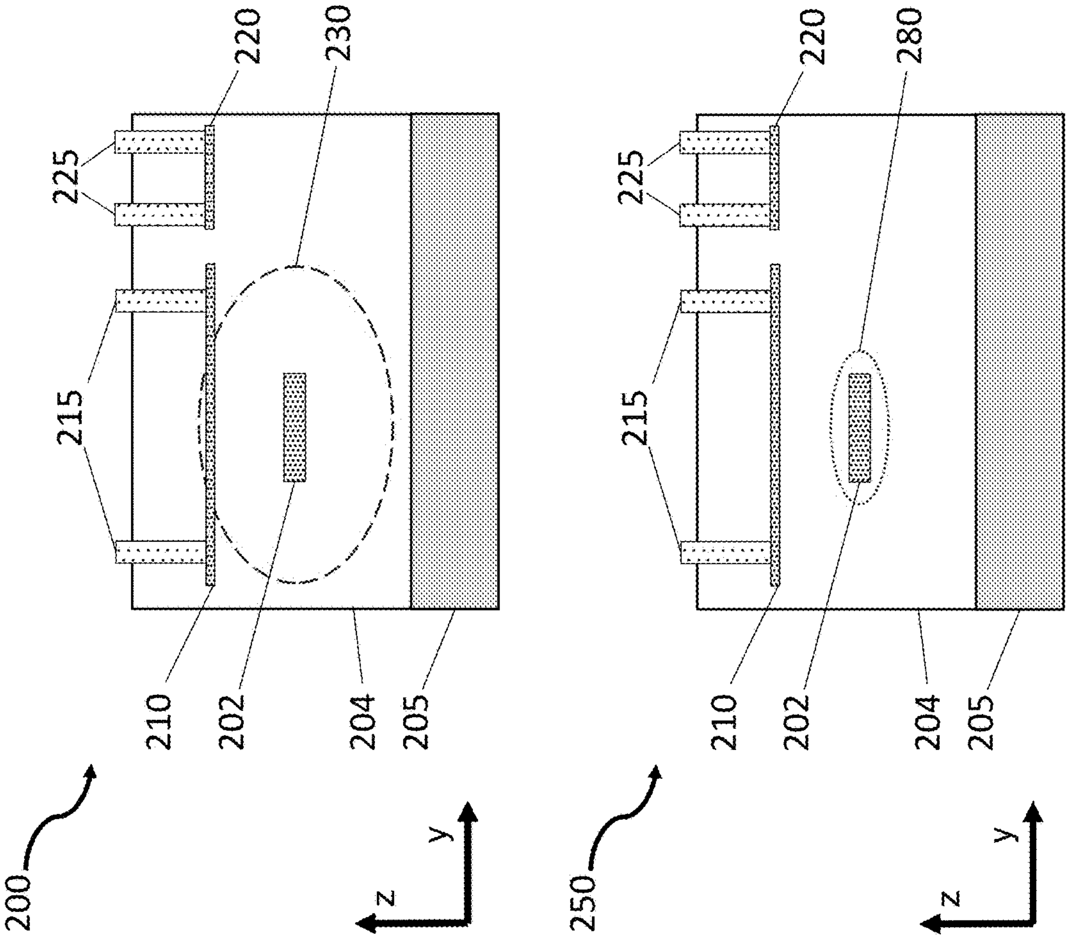
FIG. 2 shows cross-sectional views of elements of a single resonator frequency conversion device according to some embodiments of the present invention.

FIG. 2 shows two cross-sectional views corresponding to some embodiments of present invention in which two de-coupled tuning mechanisms are used, acting on a single waveguide resonator such as that shown in view 170 of FIG. 1, in an arrangement that improves the performance (with respect to prior art) of non-linear frequency conversion in a resonator, regardless of the wavelength of that light. View 200 corresponds to operation at the fundamental frequency of that light, and view 250 corresponds to operation at its upconverted, harmonic frequency. For simplicity, the following discussion will primarily refer to $2^{nd}$ order harmonic generation, although it will be appreciated that the same principles apply with frequency conversion to higher order harmonics.

The views in FIG. 2 do not show input and output ports or the two coupler structures required to couple light into and out of the resonator, but it should be appreciated that they must be present, roughly as indicated in view 170, and would function in the way described below with respect to the FIG. 4 embodiments, where one coupler is optimized to couple frequencies in a range including the fundamental frequency of light received at the input port, while the other coupler is optimized to couple frequencies in a range including the higher order harmonic frequency desired in the light output. It should be noted that the frequency range for the coupler optimization can be quite broad, as long as it is narrow enough to couple one frequency of the harmonically related pair, while excluding the other. This enables the coupler to work as intended over a relatively large wavelength range. In some embodiments (not shown here, but shown in Marco Clementi et al.), a single coupler structure can be used to couple both the fundamental and higher order harmonic frequencies, but such approach generally has inferior performance as optimization of a single coupler to work at two significantly different frequencies is more challenging.

View 200 shows a cross-sectional view of an illustrative waveguide resonator geometry in which the optical mode 230 (operating at the fundamental frequency) is guided by a waveguide formed by layer 202 and layer 204. Layer 202 provides the core of the waveguide, and layer 204 provides the cladding for the optical mode. The optical mode propagates in the x-direction, while the lateral spread of the optical mode in the y-z plane is suggested by the dashed line 230. Layer 202, in some embodiments, comprises at least one of the following materials: silicon nitride (SiN), silicon oxynitride (SiNOx), titanium dioxide (TiO2), tantalum pentoxide (Ta2O5), (doped) silicon dioxide (SiO2), LiNbO3, LiTaO3 and aluminum nitride (AlN), while layer 204, in some embodiments, comprises at least one of the following materials SiO2, SiNOx, SiN. In all embodiments, the refractive index of layer 202 is larger than the refractive index of layer 204. The illustrative cross-section includes a substrate 205 that can be any suitable substrate for semiconductor and dielectric processing, such as silicon (Si), indium phosphide (InP), gallium arsenide (GaAs), quartz, sapphire, glass, gallium nitride (GaN), silicon-on-insulator or other materials known in the art.

Tuner element 220 positioned at a relatively large distance from waveguide core 202 in the view shown has no significant spatial overlap with the fundamental optical mode, meaning that it directly interacts with very little if any of the guided optical power in that mode. In some embodiments, the overlap might be <0.1%, meaning that "no significant" would be defined to be <0.1%; in others it might be larger, e.g., <5%. Two or more electrical connections 225 are used to provide control signals such as current and/or voltage to drive the tuner 220. In some embodiments, tuner 220 is a heater element or resistor that generates heat when current is passed through it. Examples of heater/resistor elements can be various metals, or doped semiconductors. Although there is no significant spatial overlap between the tuner 220 and the optical mode 230, the heat generated at tuner 220 when it is electrically driven propagates through cladding 204 and reaches waveguide core 202, changing the effective refractive index of both the cladding and the core, and correspondingly changing the optical path length for any guided mode, tuning the resonator as will be described in more detail with the help of FIG. 3.

Tuner element 210, positioned significantly closer to the waveguide core 202 does have significant spatial overlap with the fundamental optical mode 230, meaning that, in some embodiments, it interacts with >0.1% of the guided optical power in that mode. In other embodiments, it interacts with >5% of guided optical power in that mode. Element 210 is a material that is optically transparent at the fundamental frequency, and that changes its own refractive index in response to an applied voltage or current. Examples of such materials are electro-optic materials (LiNbO3, LiTaO3, KTP, etc.) or transparent conductive oxide (TCO) materials such as indium-tin-oxide (ITO), zinc oxide (ZnO), aluminum-doped zinc oxide (AZO). In electro-optic materials, the refractive index of a medium can change with the application of an electric field, while in TCO materials, the refractive index can be changed by changing the carrier concentration either by doping and applying an electric field, or by applying a current that changes the carrier concentration. The voltage or current is applied through two or more electrical connections 215. The key difference between second tuner element 210 and first tuner element 220 is that the refractive index change caused by second tuner element 210 is localized to the tuner region, while in the case of first tuner element 220 the refractive index changes are indirect, as they are thermally induced, and can affect cladding 204 and core 202, even though there is no significant spatial overlap between tuner 220 and the mode. Other effects that can change the refractive index of a material locally, within the volume occupied by the material, while also providing optical transparency at the fundamental frequency can be used for second tuner element 210.

View 250 shows the same cross-sectional view of the illustrative waveguide geometry as shown in view 200, but now for an optical mode operating at the $2^{nd}$ harmonic of the fundamental frequency. As the $2^{nd}$ harmonic mode has a higher frequency than the fundamental, and a correspondingly shorter wavelength, it is more tightly confined around the waveguide core 202. The smaller lateral spread of the $2^{nd}$ harmonic mode is indicated by the smaller size of the region bounded by the dotted line 280. In contrast to the fundamental optical mode at the fundamental frequency, the $2^{nd}$ harmonic mode has no significant spatial overlap with either of the tuner elements 210 and 220, meaning that in some embodiments neither tuner element directly interacts with >0.1% of the guided optical power in the $2^{nd}$ harmonic mode. In other embodiments, neither tuner element directly interacts with >5% of the guided optical power in the $2^{nd}$ harmonic mode. This results in tuner 210 having negligible impact on the $2^{nd}$ harmonic mode, as its tuning effect—directly changing refractive index—is confined to the region tuner 210 itself occupies, while tuner 220 can indirectly change the refractive index of the $2^{nd}$ harmonic mode, as the heat it generates can reach and influence cladding 204 and core 202.

The end result is that as tuner 220 can have an impact on both the fundamental and the $2^{nd}$ harmonic modes, while tuner 210 can impact only the fundamental mode, we can achieve de-coupled control of resonances at the two frequencies, as will be further explained with the help of FIGS. 3-6. In other words, the two tuners are operated separately but in cooperation, adjusting the resonator's optical path length to achieve resonance for each of the two frequencies. Moreover, this can be done over a wide range of input operating wavelengths.

Figure 3:
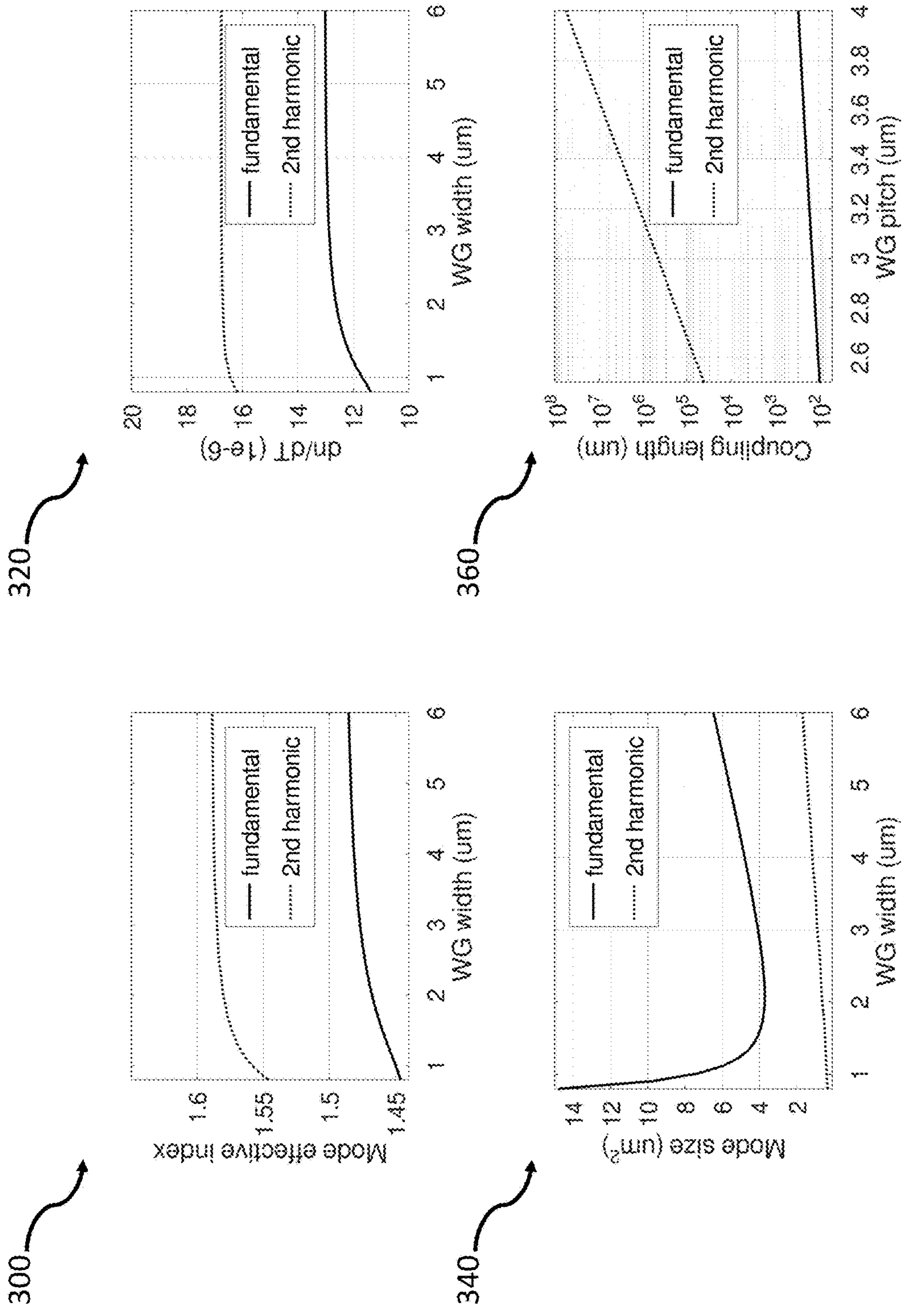
FIG. 3 shows illustrative numerical calculations for waveguide parameters relevant to various embodiments of the present invention.

FIG. 3 shows several illustrative simulation results that demonstrate the limitations associated with the prior art and the benefits of the present invention in enabling de-coupled control of resonator resonances at two harmonically related frequencies of interest.

View 300 shows effective mode index calculated as a function of waveguide (WG) width at the fundamental and $2^{nd}$ harmonic frequencies. This illustrative simulation, just as those discussed below for views 320, 340 and 360, assumes a waveguide geometry including a 100 nm thick SiN waveguide core layer in a SiO2 cladding, and fundamental mode calculations are performed for a wavelength of 1550 nm, while $2^{nd}$ harmonic mode calculations are performed for a wavelength of 775 nm. It is immediately obvious that the effective index of the mode at the fundamental frequency is much lower than at the $2^{nd}$ harmonic as the fundamental mode is less confined in the SiN core, and more of the optical mode resides in the SiO2 cladding, which of course has a lower refractive index than that of the core. The significant difference of index experienced by the fundamental and $2^{nd}$ harmonic frequencies would be expected to make direct phase matching challenging.

View 320 shows thermo-refractive coefficient (dn/dT), corresponding to the change of the refractive index with temperature, calculated as a function of waveguide (WG) width, at the fundamental and $2^{nd}$ harmonic frequencies. The thermo-refractive coefficient is a measure of thermal tunability of the mode and is determined by the materials used to make the waveguide. Si, for example, has a relatively large dn/dT (~1.84e-4), while SiN has a significantly smaller dn/dT (~2.5e-5), and SiO2 has an even lower dn/dT (~1.1e-5). As the WG width is changed, the dn/dT of the mode changes as the confinement in SiN and SiO2 changes. While fundamental and $2^{nd}$ harmonic modes have different dn/dT values, which allows some tunability to align both of the resonances, meaning that the optical path length for each mode can be adjusted, the two cannot be independently adjusted, so efficient non-linear frequency conversion is not possible at all temperatures and wavelengths as e.g. shown in FIG. 2 of Marco Clementi et al, cited above, which shows large regions with no efficient harmonic generation despite tuning the resonators through a relatively large temperature range, from ~20° C. to ~90° C.

View 340 shows mode sizes for fundamental and $2^{nd}$ harmonic modes as a function of waveguide (WG) width. The two modes clearly have significantly different mode sizes, with the $2^{nd}$ harmonic mode size being much smaller than the fundamental mode size. This means that a PIC can be designed with two tuner elements as shown in FIG. 2 such that the $2^{nd}$ harmonic mode has no significant spatial overlap (<0.1%) with one of the two tuner elements, while the fundamental mode does have significant spatial overlap (>0.1%) with that tuner element.

Figure 4:
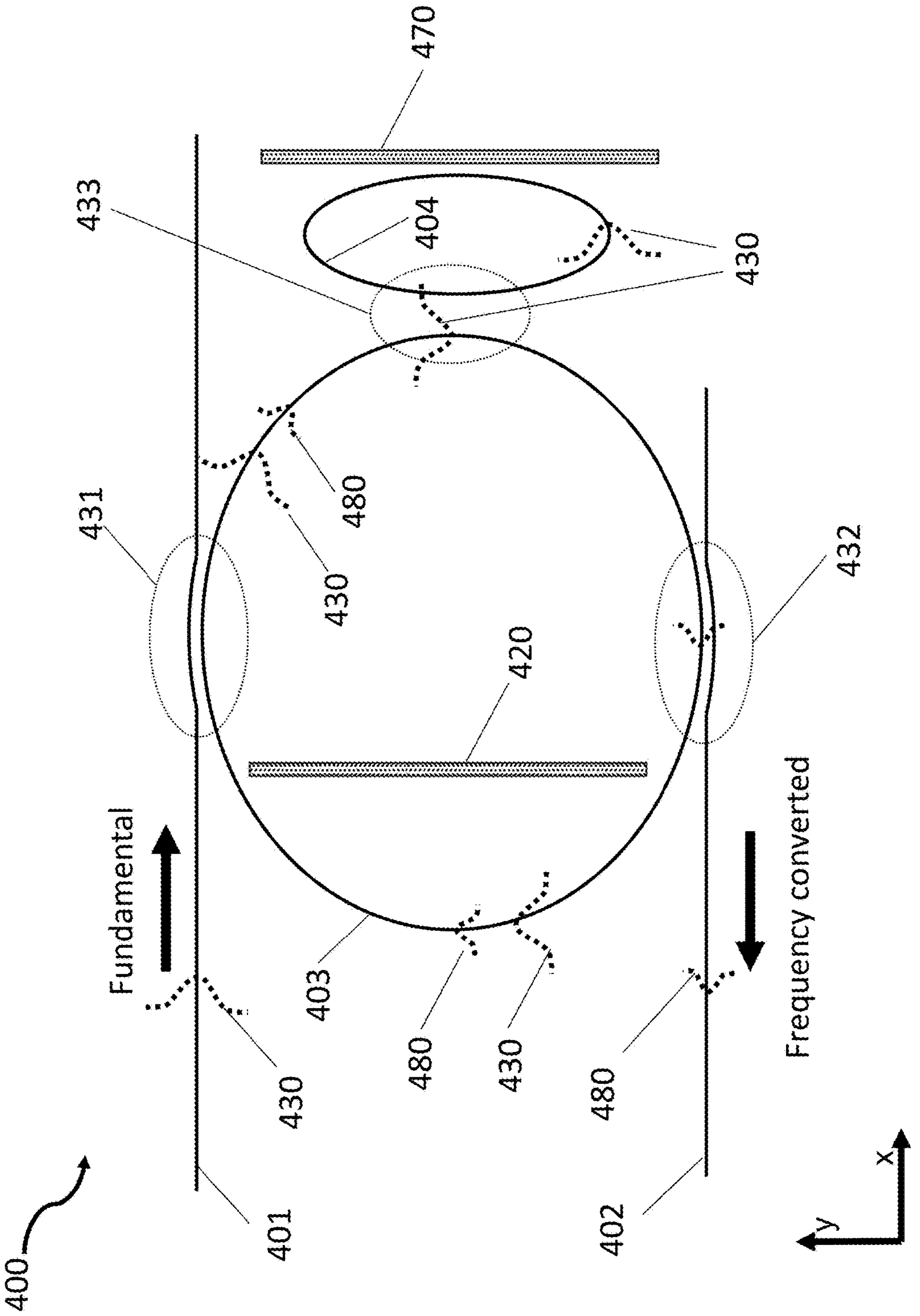
FIG. 4 illustrates a top-down view of a two resonator based frequency conversion device according to some other embodiments of the present invention.

View 360, relevant to more complex resonator embodiments such as those discussed below with respect to FIG. 4, shows coupling lengths for an illustrative directional coupler waveguide configuration calculated as a function of waveguide (WG) pitch for the fundamental and $2^{nd}$ harmonic modes. A coupling length is the length required to couple 100% of the light from a first waveguide to a second waveguide in a directional coupler design. The illustrative configuration utilizes two closely spaced parallel waveguides with 100 nm SiN thickness and 1 μm width, where the spacing, the waveguide pitch, is defined as the distance between the central points of the two waveguides. The simulations show that the coupling lengths for the two modes are significantly different, with the coupling length for the $2^{nd}$ harmonic mode being greater by several orders of magnitude than that for the fundamental mode. This enables us to de-couple resonance control of those modes, as will be described in relation to FIG. 4. In this approach, a waveguide resonator can be "loaded" at the fundamental frequency using another resonator while the same resonator is essentially not coupled at the $2^{nd}$ harmonic frequency, due to the much longer coupling length required at that $2^{nd}$ harmonic frequency.

FIG. 4 depicts a top-down view 400 of a photonics integrated circuit (PIC) providing efficient frequency conversion at any arbitrary wavelength, according to some embodiments of the present invention. In the illustrated embodiment, the frequency conversion PIC comprises input port 401 for the fundamental frequency, output port 402 for the frequency converted signal ($2^{nd}$ harmonic), and two resonators 403 and 404. The fundamental frequency signal is characterized by the fundamental optical mode 430, while the $2^{nd}$ harmonic frequency signal is characterized by the $2^{nd}$ harmonic optical mode 480, where the optical mode size of the $2^{nd}$ harmonic is significantly smaller than the optical mode size of the fundamental as described with FIG. 4 and view 340. The fundamental mode is efficiently coupled into first resonator 403 using first coupler structure 431 optimized by design for operation at or near the fundamental frequency, while the frequency converted signal ($2^{nd}$ harmonic) is efficiently coupled out of first resonator 403 by second coupler structure 432 optimized by design for operation at or near the $2^{nd}$ harmonic frequency. Optimization of coupling structures for a particular wavelength range can utilize phase matched directional and/or pulley couplers as is known in the art of designing high-performance coupling structures and resonators. The coupling lengths of pulley couplers follow similar trends as directional (straight) couplers shown in view 360 of FIG. 3 as mode sizes are different at two frequencies, but require additional design and phase matching to account for different radius of curvature of the resonator and the bus waveguide. This further allows optimization of coupling at two different wavelengths, where phase matching can be high at one frequency (supporting efficient coupling), and, at the same time, phase matching can be low at the other frequency (suppressing efficient coupling). Both the fundamental and $2^{nd}$ harmonic modes co-propagate inside first resonator 403 which can be efficiently tuned using tuning element 420. Tuning element 420 tunes both resonances, and, in some embodiments, can be a heater element as described in relation to FIG. 2 and element 220.

Second resonator 404 is coupled to first resonator 403 using third coupler 433. Third coupler 433 is designed such that the fundamental frequency is coupled reasonably efficiently between the first resonator 403 and the second resonator 404, while the $2^{nd}$ harmonic frequency is either not coupled at all or is coupled with an efficiency that is at least one order of magnitude lower. In some embodiments, reasonable efficiency of coupling can be defined as meaning a coupling value that is greater than 0.1%. In other embodiments reasonable coupling efficiency can be a different value (either larger or smaller), depending on the roundtrip loss of the second resonator 404 to provide substantial loading of the first resonator 403 at the fundamental frequency. This can easily be achieved by controlling the gap (pitch) between the two waveguides as illustrated with the help of FIG. 3 and view 360, and also by utilizing phase matching with pulley couplers as explained above In some embodiments, both the gap and phase matching is utilized to optimize the performance. Second resonator 404 can be tuned using tuning element 470 in the same way as resonator 403 is tuned using element 420 but in this case the tuning only impacts the fundamental frequency as the $2^{nd}$ harmonic mode is essentially not coupled into the second resonator from the first resonator. This enables de-coupling of the tuning of the fundamental and $2^{nd}$ harmonic to enable efficient non-linear generation inside the resonator 403 at any frequency/wavelength even if only thermal tuning is utilized. In yet other embodiments, at least one of the couplers 431, 432 or 433 can be made tunable to provide yet another degree of control as described with the help of FIG. 5.

Figure 5:
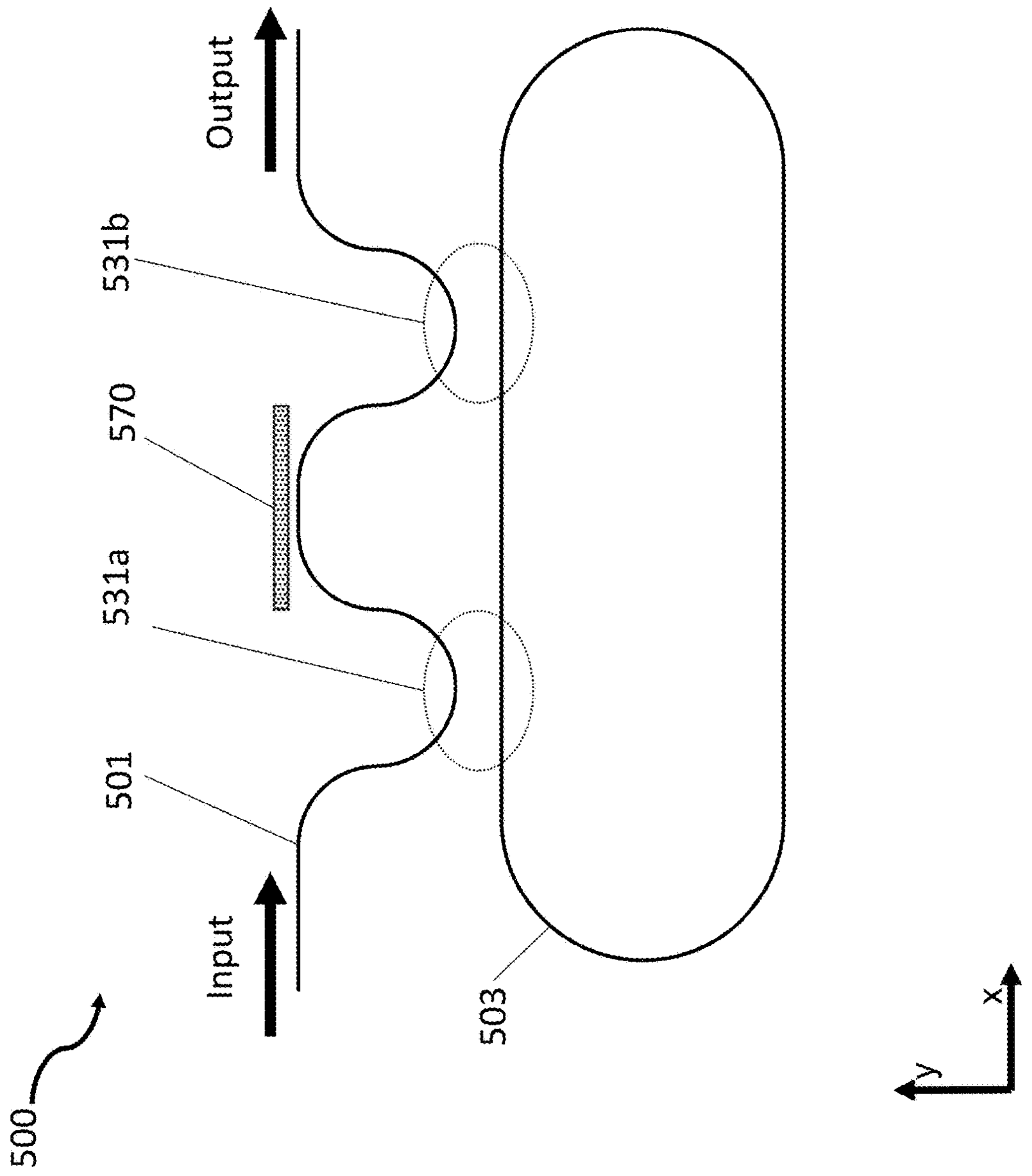
FIG. 5 illustrates a top-down view of a tunable coupling resonator-based frequency converter using selective resonator loading according to yet other embodiments of the present invention.

FIG. 5 depicts a top-down view 500 of a photonics integrated circuit (PIC) providing tunable coupler functionality utilized in some embodiments of the present invention. It shows details of just one tunable coupler for simplicity, but it should be noted that a tunable coupler of the type shown can replace any or all of the couplers 431, 432 and 433 as shown in FIG. 4. A resonator 503 is coupled to a bus waveguide 501 in at least two coupling regions, region 531*a* and region 531*b*. Coupling regions are designed such that one frequency (either the fundamental or a higher order harmonic) is coupled reasonably efficiently between resonator 503 and the bus waveguide 501, while the other frequency is not coupled at all, or is coupled poorly, by at least one order of magnitude less. This can easily be achieved by controlling the gap between the two waveguides as illustrated with the help of FIG. 3 and view 360 and/or by using phase matching and pulley couplers as explained above. The benefit of using a tunable coupler is the additional control it affords of the total coupling by tuner element 570 positioned in such way to change the phase of the signal between the two coupling regions 531*a* and 531*b*. As the phase is tuned, we can create the right conditions for the two parts of the signals (each transferred into resonator or coupled out of the resonator at two coupling regions) to combine fully in phase, completely out of phase, or something in between, with the total effective coupling strength being controlled by this coherent interaction of two electrical fields of the optical signal.

Figure 6:
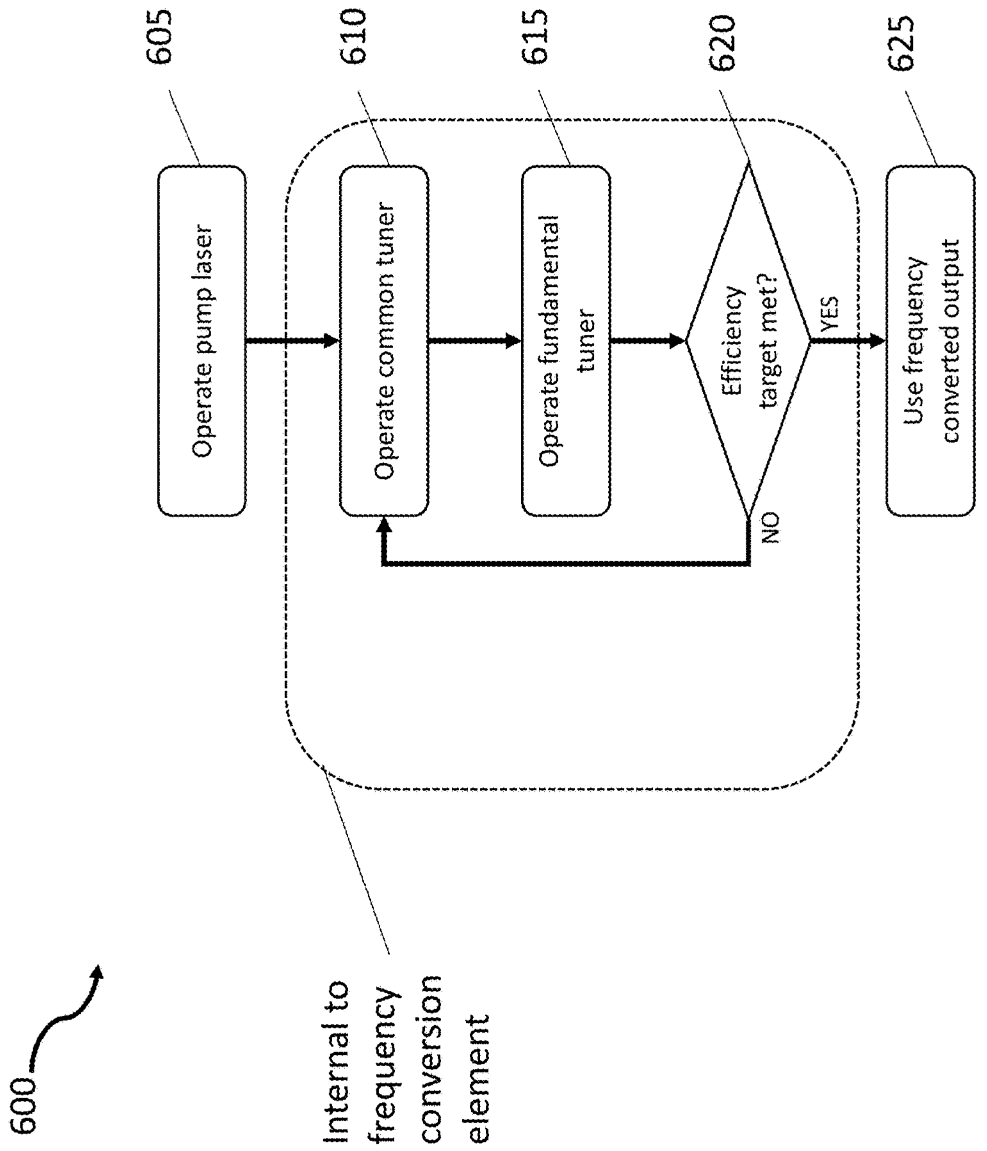
FIG. 6 illustrates a method of control used in some embodiments of the present to achieve optimal performance.

FIG. 6 depicts a method associated with operation of the improved non-linear conversion resonator in accordance with various embodiments described herein.

Method 600 begins with operation 605 in which the pump laser is turned on and coupled to the frequency conversion element. Once the laser is powered and suitably coupled to the frequency conversion element, the optimization of operation is initialized with operations 610, 615 and 620. In operation 610, the common tuner (corresponding to, for example, 220, 420) is operated with the goal of improving the frequency conversion efficiency. In operation 615, the fundamental tuner (corresponding to, for example, 210, 470) is operated with the goal of improving the frequency conversion efficiency. Operations 610 and 615 are shown to be sequential with 610 preceding 615 in method 600, but the order can be inverted, or they can be simultaneously executed. Once both tuners are adjusted, method 600 determines at operation 620 if a predetermined metric of efficiency (conversion efficiency from the fundamental mode to the $2^{nd}$ harmonic mode) has been met. If not, the method goes back to operation 610 and performs another combination of operating fundamental and common tuners until the efficiency metric is met. Once that efficiency metric is met, the method proceeds to operation 625 in which the frequency converted output is utilized. The ability to independently operate at least the fundamental resonance condition utilizing a fundamental tuner enables the resonant architecture to achieve efficient non-linear conversion at any frequency by matching both resonances.

It is to be understood that these illustrative embodiments teach just some examples of frequency conversion elements utilizing the present invention, and many other, similar arrangements can be envisioned where tunings of the resonator at two frequency ranges is decoupled. Furthermore, frequency conversion elements can be combined with multiple other components to provide additional functionality or better performance such as various filtering elements, amplifiers, monitor photodiodes, modulators and/or other photonic components.

Embodiments of the present invention offer many benefits. The ability to de-couple tuning at two frequency ranges enables realization of highly efficient non-linear generation using resonant elements at essentially any wavelength, and to account for any fabrication variation. This in turn enables scalable manufacturing of PICs utilizing non-linear conversion including high density devices.

Embodiments of the optical devices described herein may be incorporated into various other devices and systems including, but not limited to, various computing and/or consumer electronic devices/appliances, communication systems, medical devices, sensors, and sensing systems.

It is to be understood that the disclosure teaches just a few examples of the illustrative embodiment and that many variations of the invention can easily be devised by those skilled in the art after reading this disclosure and that the scope of the present invention is to be determined by the following claims.

The invention claimed is:

1. A device comprising:

an input port configured to receive as a device input a fundamental optical mode characterized by an input wavelength and a corresponding fundamental frequency;

an output port configured to provide as a device output an $N^{th}$ harmonic mode characterized by a $N^{th}$ harmonic frequency relative to the fundamental frequency, where N>1; and a resonator with first and second coupler structures and first and second tuner elements;

wherein the first coupler structure is optimized for operation at the fundamental frequency, and the second coupler structure is optimized for operation at the $N^{th}$ harmonic frequency;

wherein the first tuner element can change a refractive index experienced by each of the fundamental and $N^{th}$ harmonic optical modes; and wherein the second tuner element can change a refractive index experienced by the fundamental optical mode but cannot change a refractive index experienced by the Nth harmonic optical mode.

2. The device of claim 1, wherein, during operation thereof, the first and second tuning elements are operable to maximize an efficiency of non-linear conversion of the fundamental optical mode in the resonator, regardless of the input wavelength, by tuning the resonator to be resonant at the fundamental frequency corresponding to that input wavelength and at the $N^{th}$ harmonic frequency corresponding to that input wavelength.

3. The device of claim 2, wherein when the input wavelength lies at any arbitrary wavelength in a first range between 1100 nm and 1700 nm, the device output is a $2^{nd}$ harmonic, characterized by an output wavelength in a second range between 550 nm and 850 nm.

4. The device of claim 2, wherein when the input wavelength lies at any arbitrary wavelength between 780 nm and 1100 nm, the device output is a $2^{nd}$ harmonic, characterized by an output wavelength between 390 nm and 550 nm.

5. The device of claim 2, wherein when the input wavelength lies at any arbitrary wavelength between 1100 nm and 1700 nm, the device output is a $3^{rd}$ harmonic, characterized by an output wavelength between 366 nm and 566 nm.

6. The device of claim 1, wherein at least one of the first and second couplers is configured to be tunable.

7. The device of claim 1, wherein a core of a waveguide in the resonator comprises at least one of silicon nitride (SiN), silicon oxynitride (SiNOx), titanium dioxide (TiO2), tantalum pentoxide (Ta2O5), (doped) silicon dioxide (SiO2), lithium niobate (LiNbO3), lithium tantalate (LiTaO3) and aluminum nitride (AlN).

8. The device of claim 7, wherein a cladding of a waveguide in the resonator comprises at least one of silicon nitride (SiN), silicon oxynitride (SiNOx) and silicon dioxide (SiO2), and the refractive index of the core of the waveguide is higher than the refractive index of the cladding of the waveguide.

9. A device comprising:

an input port configured to receive as a device input a fundamental optical mode characterized by an input wavelength and a corresponding fundamental frequency;

an output port configured to provide as a device output an $N^{th}$ harmonic mode characterized by a $N^{th}$ harmonic frequency relative to the fundamental frequency, where N>1; and first and second resonators, first, second and third coupler structures and first and second tuner elements;

wherein the first and third coupler structures are optimized for operation at the fundamental frequency, and the second coupler structure is optimized for operation at the $N^{th}$ harmonic frequency;

wherein the first tuner element is positioned in relation to the first resonator such that the first tuner element can tune each of the fundamental optical mode and the Nth harmonic mode; and wherein the third coupler structure and the second tuner element are positioned in relation to the second resonator such that the second tuner element can tune the fundamental optical mode and has no significant tuning effect on the $N^{th}$ harmonic optical mode.

10. The device of claim 9, wherein, during operation thereof, the first and second tuner elements are operable to maximize an efficiency of non-linear conversion of the fundamental optical mode in the first resonator, regardless of the input wavelength, by tuning the first resonator to be resonant at the fundamental frequency corresponding to that input wavelength and at the $N^{th}$ harmonic frequency corresponding to that input wavelength, and by tuning the second resonator such that loading of the first resonator at the fundamental frequency by the second resonator enables the first resonator to be resonant at both the fundamental and Nth harmonic frequencies regardless of input wavelength.

11. The device of claim 10, wherein when the input wavelength lies at any arbitrary wavelength in a first range between 1100 nm and 1700 nm, the device output is a $2^{nd}$ harmonic, characterized by an output wavelength in a second range between 550 nm and 850 nm.

12. The device of claim 10, wherein when the input wavelength lies at any arbitrary wavelength between 780 nm and 1100 nm, the device output is a $2^{nd}$ harmonic, characterized by an output wavelength between 390 nm and 550 nm.

13. The device of claim 10, wherein when the input wavelength lies at any arbitrary wavelength between 1100 nm and 1700 nm, the device output is a $3^{rd}$ harmonic, characterized by an output wavelength between 366 nm and 566 nm.

14. The device of claim 9, wherein at least one of the coupler structures is configured to be a tunable coupler structure.

15. The device of claim 9, wherein a core of a waveguide of in the resonator comprises at least one of silicon nitride (SiN), silicon oxynitride (SiNOx), titanium dioxide (TiO2), tantalum pentoxide (Ta2O5), (doped) silicon dioxide (SiO2), lithium niobate (LiNbO3), lithium tantalate (LiTaO3) and aluminum nitride (AlN); and wherein the cladding of the waveguide in the resonator comprises at least one of silicon nitride (SiN), silicon oxynitride (SiNOx) and silicon dioxide (SiO2), and the refractive index of the core of the waveguide in the resonator is higher than the refractive index of the cladding of the waveguide in the resonator.

* * * * *